United States Patent Office 3,211,758
Patented Oct. 12, 1965

3,211,758
PROCESS FOR THE MANUFACTURE OF FLUORINATED STEROIDS
Niklaus Tarkoey, Basel, Switzerland, assignor to Ciba Corporation, New York, N.Y., a corporation of Delaware
No Drawing. Filed Oct. 3, 1963, Ser. No. 313,417
Claims priority, application Switzerland, Oct. 12, 1962, 12,056/62; Aug. 26, 1963, 10,511/63
23 Claims. (Cl. 260—397.2)

The present invention provides a process for the manufacture of vicinal fluoro-hydroxysteroids from epoxysteroids.

The introduction of the fluorine atom into the steroid molecule, more especially the preparation of vicinal fluoro-hydroxysteroids, has become exceedingly important, and new processes have been developed to arrive at most favourable methods and maximum yields. In this connection the treatment of epoxysteroids with hydrogen fluoride, for example dissolved in chloroform or in tetrahydrofuran as solvent or more especially in dimethylformamide, has been used in industry.

The present invention provides a process which enables the fluorinating opening of the epoxides in a high yield and in a very simple manner; it consists in treating the steroid-epoxide with the solution formed by mixing anhydrous hydrogen fluoride with a carbamic acid or thiocarbamic acid or with an amide or ester of such acid.

The afore-mentioned carbamic acid or thiocarbamic acid compounds are, for example, the free carbamic or thiocarbamic acids or their esters, as well as their derivatives alkylated at the nitrogen atom, more especially N-methyl-, N-diethyl-, N-monomethyl-, N-monoethyl-carbamic or -thiocarbamic acid. Particularly suitable esters of these compounds are: Lower alkyl esters, for example methylurethane, ethylurethane, isopropylurethane or the like. Furthermore, there may be used with advantage amides of the afore-mentioned carbamic or thiocarbamic acids; specifically, there may be mentioned: Urea, thiourea, N-mono-, di-, tri- or tetra-lower alkyl ureas, for example, tetramethyl urea, symmetrical dimethylurea, asymmetrical dimethylthiourea or the like.

When the said carbonic acid derivatives are mixed with anhydrous hydrogen fluoride, preferably with liquid hydrogen fluoride, they are transformed into colourless, very little fuming, storable liquids. The mixing of the afore-mentioned substances is best performed at an elevated temperature, preferably between +30° and +70° C., and the ratio of the quantities of the carbonic acid derivative and of the hydrogen fluoride is generally within the range of about 0.65 to 1.7, preferably 0.8 to 1.7.

The present process can be performed within a temperature interval which is very wide compared with that required in similar, known methods. Thus, the epoxide ring itself can be opened up at +20° to 30° C. with the obtention of a pure vicinal fluoro-hydroxy-steroid in a very good yield. Moreover, several of the said carbonic acid derivatives (for example, urea) are available in a very high degree of purity and more cheaply than the solvents used up to now. In addition, many of them are solid and can thus be dried more easily than the liquid solvents just mentioned.

The epoxysteroids used as starting materials belong, for example, to the pregnane, androstane, spirostane, furostane, cholane, cholestane or cardanolide series, or to the triterpenes, for example of the lanostane series, in which the epoxide group to be split may be, for example, in positions $1\alpha:2\alpha$, $1\beta:2\beta$, $2\alpha:3\alpha$, $2\beta:3\beta$, $3\alpha:4\alpha$, $3\beta:4\beta$, $4\alpha:5\alpha$, $4\beta:5\beta$, $5\alpha:6\alpha$, $5\beta:6\beta$, $6\alpha:7\alpha$, $6\beta:7\beta$, $8\alpha:9\alpha$, $9\alpha:11\alpha$, $9\beta:11\beta$, $11\alpha:12\alpha$, $11\beta:12\beta$, $14\alpha:15\alpha$, $14\beta:15\beta$, $15\alpha:16\alpha$, $15\beta:16\beta$, $16\alpha:17\alpha$, $16\beta:17\beta$, $17\alpha:20\alpha$, or $17\beta:20\beta$.

The following examples illustrate the process of the invention. Unless otherwise indicated, parts and percentages are by weight.

*Example 1*

1.25 parts of anhydrous hydrofluoric acid are stirred dropwise or distilled into 1 part of urea at a rate such that the internal temperature rises to about 50 to 55° C. The resulting water-clear liquid is cooled and stored in a stoppered vessel at 0° C. 500 mg. of $\Delta^{1,4}$-16$\alpha$-methyl-6$\alpha$-fluoro-9$\beta$:11$\beta$-oxido-17$\alpha$:21-dihydroxy-3:20 - dioxo-pregnadiene-21-trimethylacetate are added to 10 cc. of the above fluorinating reagent and the suspension is stirred at 0° C. After about 2 hours a substantially complete solution has been obtained which is of a pale-pink color. After 3 to 3½ hours crystallisation sets in slowly. After a total reaction period of 19 hours at 0° C. the reaction mixture forms a crystalline magma which is poured over a mixture of 100 g. of ice and 35 cc. of concentrated ammonia. The pH-value of the suspension is adjusted to about 7.5, and the precipitate is suctioned off, washed with water and dried at 110° C. under 11 mm. Hg pressure, to yield 520 mg. of crude product which, after recrystallisation from acetone+petroleum ether (boiling range 30 to 70° C.) and drying at 110° C. under 11 mm. Hg pressure for 3 hours furnishes 425 mg. of white crystals (yield of fluorination: 85%) of $\Delta^{1,4}$-16$\alpha$-methyl-9$\alpha$-difluoro-11$\beta$:17$\alpha$:21-trihydroxy-3:20 - dioxopregnadiene-21-trimethylacetate melting at (257°) 262° to 264° C. Optical rotation $[\alpha]_D^{25} = +72°$ (c.=1% in acetone). Thin-layer chromatogram (chloroform+acetone 8:2): identical with authentic material.

*Example 2*

A fluorinating reagent is prepared from equal amounts of urea and anhydrous hydrofluoric acid in the manner described in Example 1. 1.0 g. of $\Delta^{1,4}$-16$\alpha$-methyl-6$\alpha$-fluoro-9$\beta$:11$\beta$-oxido-17$\alpha$:21-dihydroxy-3:20 - dioxo-pregnadiene-21-trimethylacetate is suspended in 24 cc. of this fluorination reagent at 0° C. While stirring this suspension, 6 g. of anhydrous hydrofluoric acid are added at 0° C. ($\pm$5° C.) internal temperature. The light-orange colored solution is kept for 18 hours at 0° C. and then worked up as described in Example 1, to yield 1.05 g. of crude product which, after recrystallisation from acetone+petroleum ether (boiling range 30 to 70° C. and drying as described in Example 1, furnishes 0.797 g. (fluorination yield: 79.7%) of white crystals of $\Delta^{1,4}$-16$\alpha$-methyl-6$\alpha$:9$\alpha$-difluoro-11$\beta$:17$\alpha$:21-trihydroxy - 3:20 - dioxo-pregnadiene-21 - trimethylacetate melting at (261°) 264 to 266° C. Optical rotation $[\alpha]_D^{25} = +73°$ (1%, acetone). Thin-layer chromatogram (chloroform+acetone 8:2)=identical with the authentic material.

*Example 3*

A fluorination reagent is prepared as described in Example 1 from equal amounts of symmetrical dimethylurea and anhydrous hydrofluoric acid. 1.0 g. of 6$\alpha$-fluoro-$\Delta^{1,4}$-16$\alpha$-methyl-9$\beta$:11$\beta$-oxido - 17$\alpha$:21-dihydroxy-3:20-dioxo-pregnadiene - 21-trimethylacetate dissolves at 0° C. in 24 cc. of this reagent, the solution being of a pale-yellow-orange color. After a reaction period of 18 hours at 0° C., working up is performed as described in Example 1, and the crude product is recrystallised from acetone+petroleum ether and then dried as in Example 1. Yield: 0.758 g. (fluorination yield: 75.8%) of white crystals of $\Delta^{1,4}$-16$\alpha$-methyl-6$\alpha$:9$\alpha$-difluoro-11$\beta$:17$\alpha$:21-trihydroxy-3:20-dioxo-pregnadiene-21-trimethylacetate melting at (259°) 263 to 267° C. Optical rotation $$[\alpha]_D^{25} = +72°$$

(1%, acetone). Thin-layer chromatogram (chloroform+acetone 8:2)=identical with authentic material.

Example 4

A fluorination reagent is prepared as described in Example 1 from 1 part of thiourea and 1.25 parts of anhydrous hydrogen fluoride. 500 mg. of 6α-fluoro-Δ$^{1,4}$-16α-methyl-9β:11β-oxido - 17α:21 - dihydroxy-3:20-dioxo-pregnadiene-21-trimethylacetate dissolved at 0° C. in 10 cc. of this reagent immediately to form a pale-yellow solution. After a reaction period of 18 hours at 0° C. the batch is worked up as described in Example 1, and the crude product is recrystallised from acetone-petroleum ether and dried as in Example 1. Yield: 359 mg. (fluorination yield=71.8%) of white crystals of Δ$^{1,4}$-16α-methyl-6α:9α-difluoro - 11β:17α:21-trihydroxy-3:20-dioxo-pregnadiene-21 - trimethylacetate melting at (248°) 250 to 253° C. (=deep-melting modification). Optical rotation $[\alpha]_D^{25} = +72°$ (1% acetone). Thin-layer chromatogram (chloroform+acetone 8:2)=identical with authentic material.

Example 5

A fluorination reagent is prepared as described in Example 1 from 1 part of "urethane"

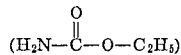

and 1,25 parts of anhydrous hydrofluoric acid. 225 mg. of Δ$^{1,4}$-16α-methyl - 6α - fluoro-9β:11β-oxido-17α:21-dihydroxy-3:20-dioxo-pregnadiene - 21 - trimethylacetate dissolve immediately at 0° C. in 5 cc. of this reagent; the solution is of pale orange colour. After 19 hours' reaction at 0° C. the batch is worked up as described in Example 1, and the crude product is recrystallised from acetone-petroleum ether and dried as described in Example 1, to yield 152 mg. (fluorination yield: 67%) of white crystals of Δ$^{1,4}$-16α-methyl-6α:9α-difluoro-11β:17α:21-trihydroxy-3:20-dioxo-pregnadiene-trimethylacetate melting at (248°) 250 to 252° C. (=deep-melting modification). Optical rotation $[\alpha]_D^{25} = +72°$ (1%, acetone).

Example 6

A fluorination reagent is prepared as described in Example 1 from 1 part of urea and 0.75 part of anhydrous hydrofluoric acid. 2.00 g. of 9β:11β-oxido-17α-methyl-testosterone dissolve at +20° C. in 20 cc. of this reagent immediately; the solution is colourless. After about 2 minutes the solution gradually turns pink, after about 5 minutes crystallisation sets in slowly, and after about 10 minutes the batch forms a reddish crystal magma. After 40 minutes' reaction at +20° C. the batch is worked up as described in Example 1, and the crude product recrystallised from acetone and dried as described in Example 1, to yield 1.40 g. (fluorination yield: 70%) of white crystals of 9α-fluoro-11β=hydroxy-17α-methyl-testosterone melting at (278°) 281 to 284° C. Optical rotation $[\alpha]_D^{25} = +107°$ (1%, ethanol).

When the identical experiment is performed at +30° C., the yield achieved of 9α-fluoro-11β-hydroxy-17α-methyl-testosterone amounts to about 62%.

Example 7

A fluorination reagent is prepared as described in Example 1 from equal parts by weight of urea and anhydrous hydrofluoric acid. 500 mg. of the acetate of Δ$^{1,4}$-16α-methyl-9β:11β - oxido-17α:21 - dihydroxy-3:20-dioxo-pregnadiene are introduced into 5 cc. of the above mixture at 20° C. The pale orange-coloured solution is stirred at 20° C.; after 2 to 3 hours crystallization sets in slowly. After stirring for about 22 hours at the same temperature the reaction is completed. The reaction mixture is poured on to a mixture of ice, concentrated ammonia and sodium bicarbonate and its pH value is adjusted to about 7.5. The batch is extracted with methylene chloride, washed with water, dried and evaporated. The residue is recrystallized from ethylene chloride to yield 372 mg. of 21-acetate of Δ$^{1,4}$-16α-methyl-9α-fluoro-11β:17α:21 - trihydroxy - 3:20 - dioxo-pregnadiene melting at 228–230° C. Optical rotation $[\alpha]_D = +79°$ (chloroform).

Example 8

A fluorination reagent is prepared as described in Example 1 from 1 part of urea and 1.25 parts of hydrofluoric acid. 1 gram of 3β-acetoxy-5α:6α-oxido-cholestane is added to 20 cc. of the above mixture at 20° C., and the batch stirred for 2 hours at 20° C. After working up as described in the preceding example, a crude product is obtained which, when recrystallized from methanol, yields 809 mg. of 3β-acetoxy-5α-hydroxy-6β-fluoro-cholestane melting at 209–210° C. Optical rotation $[\alpha]_D^{25} = 17°$ (1%, chloroform).

Example 9

1 gram of finely pulverized 3β-hydroxy-5α:6α-oxido-cholestane is added to 20 cc. of the fluorination reagent described in the preceding example at 20° C., and the mixture stirred for 1 hour at 20° C. Working up is performed as described in the preceding example to yield a crude product which, when recrystallized from methylene chloride, yields 669 mg. of 3β:5α-dihydroxy-6β-fluoro-cholestane melting at 216–218° C.

Example 10

A fluorination reagent is prepared as described in the preceding examples from equal parts of urea and anhydrous hydrofluoric acid. 300 mg. of 3β-acetoxy-5α:6α-oxido-20-oxo-pregnane are introduced in 6 cc. of the above mixture at 20° C. and the suspension stirred. After about 1 minute a white crystalline precipitate settles out. After a reaction time of 2 hours at 20° C., working up is performed as described in the preceding examples. When the crude product is recrystallized from methanol, 252 mg. of white crystals of 3β-acetoxy-5α-hydroxy-6β-fluoro-20-oxo-pregnane melting at 222–223° C. are obtained.

Example 11

A urea-hydrofluoric acid adduct is used which, as described in the preceding examples, is prepared from 1 part of urea and 1.3 parts of hydrofluoric acid. 500 mg. of finely pulverized 3β:17β-diacetoxy-5α:6α-oxido-androstane are added to 10 cc. of the above reagent and the batch stirred for 2½ hours at 20° C. After working up in the manner described in the preceding examples, a crude product remains which is recrystallized from a mixture of acetone and water to yield 340 mg. of white crystals of 3β:17β-diacetoxy-5α-hydroxy-6β-fluoro-androstane melting at 212.5–214.5° C.

Example 12

200 mg. of 3β:17α-diacetoxy-5α:6α-oxido-20-oxo-pregnane are added to 6 cc. of a fluorination reagent prepared from equal parts of urea and hydrofluoric acid as described in the preceding examples, and the batch stirred at 20° C. The substance dissolves immediately and after about 3 minutes a thick, white crystalline precipitate settles out. After stirring for about 3 hours at 20° C. the reaction mixture is worked up as described in the preceding examples. The crude product is recrystallized from a mixture of acetone and hexane to yield 157 mg. of white crystals of 3β:17α-diacetoxy-5α-hydroxy-6β-fluoro-20-keto-pregnane melting at 262.5–263.0° C. Optical rotation $[\alpha]_D = -34°$ (chloroform).

Example 13

800 mg. of 3β:17β-diacetoxy-6β:7-oxido-5α-androstane are suspended in a polyethylene vessel in 15 cc. of a fluorination reagent prepared from 0.75 part of urea and 1 part of hydrofluoric acid and the batch stirred for 15 hours at 22° C. The reaction mixture which contains crystalline product is then poured with stirring into about 500 cc. of an ice-cold saturated sodium bicarbonate solution; the mixture is extracted twice with ether, the organic layers are washed neutral with water, dried and evaporated at a water-jet vacuum. The precipitated crude product (800 mg.) is crystallized from a mixture of methylene chloride, ether and petroleum ether to yield 508 mg. of pure 3β:17β-diacetoxy-6β-hydroxy-7α-fluoro-5α-androstane melting at 167–168° C. In the infrared spectrum bands are displayed, inter alia, at 2.76, 5.77, 8.12, 9.12, 9.71 and 10.65μ. Optical rotation $$[\alpha]_D^{20°} = -33°$$

(c.=0.385).

The epoxide used as starting material may be prepared as follows: 3β:17β-diacetoxy-5α-bromo-6-oxo-androstane is converted in a manner known per se into the isomeric 3β:17β-diacetoxy-6-oxo-7α-bromo-5α-androstane by heating briefly with hydrobromic acid in glacial acetic acid. The latter product yields after reduction of the oxo group by means of sodium borohydride a mixture of the alcohols epimeric in the 6-position; this mixture can be separated by crystallization or chromatography on silicagel. The resulting 3β:17β-diacetoxy-6β-hydroxy-7α-bromo-5α-androstane passes over into the desired 3β:17β-diacetoxy-6β:7-oxido-5α-androstane on being treated with sodium hydroxide solution.

What is claimed is:

1. Process for the manufacture of vicinal fluorohydroxy-steroids selected from the group consisting of those of the pregnane, androstane, spirostane, furostane, cholane, cholestane, cardanolide and lanostane series which comprises reacting a corresponding steriod epoxide with the solution formed by mixing anhydrous hydrogen fluoride with a carbonic acid derivative of the formula

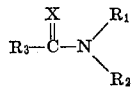

wherein $R_1$ and $R_2$ are each members selected from the group consisting of hydrogen and lower alkyl, $R_3$ is a member selected from the group consisting of hydroxy, lower alkoxy, primary amino, N-lower alkyl-amino and N,N-di-lower alkyl-amino, and X is a member selected from the group consisting of oxygen and sulfur.

2. Process as claimed in claim 1, wherein an N-alkylated carbamic acid is used as the carbonic acid derivative.

3. Process as claimed in claim 1, wherein an N-alkylated carbamic acid lower alkyl ester is used as the carbonic acid derivative.

4. Process as claimed in claim 1, wherein an alkylated urea is used as the carbonic acid derivative.

5. Process as claimed in claim 1, wherein urea is used as the carbonic acid derivative.

6. Process as claimed in claim 1, wherein thiourea is used as the carbonic acid derivative.

7. Process as claimed in claim 1, wherein symmetrical dimethylurea is used as the carbonic acid derivative.

8. Process as claimed in claim 1, wherein ethylurethane is used as the carbonic acid derivative.

9. Process as claimed in claim 1, wherein the fluorinating reagent used for the splitting of the steroid epoxide is prepared by mixing the anhydrous hydrofluoric acid with the carbonic acid derivative at a temperature of +30° to +70° C.

10. Process as claimed in claim 1, wherein the reaction of the steroid epoxide with the fluorinating reagent is carried out within the temperature range of 0–30° C.

11. Process as claimed in claim 1, wherein in the preparation of the fluorinating reagent the quantity ratio of carbonic acid derivative to anhydrous hydrofluoric acid is chosen within the range of 0.65–1.7.

12. Process as claimed in claim 1, wherein in the preparation of the fluorinating reagent the quantity ratio of carbonic acid derivative to anhydrous hydrofluoric acid is chosen within the range of 0.8–1.7.

13. Process as claimed in claim 1, wherein an epoxide of the pregnane series is used as starting material.

14. Process as claimed in claim 13, wherein the 21, trimethylacetate of $\Delta^{1,4}$ - 16α - methyl - 6α-fluoro-9β:11β-oxido-17α:21-dihydroxy-3:20-dioxo-pregnadiene is used as starting material.

15. Process as claimed in claim 13, wherein the 21-acetate of $\Delta^{1,4}$-16α - methyl - 9β:11β-oxido-17α:21-dihydroxy-3:20-dioxo-pregnadiene is used as starting material.

16. Process as claimed in claim 13, wherein 3β-acetoxy 5α:6α-oxido-20-oxo-pregnane is used as starting material.

17. Process as claimed in claim 13, wherein 3β:17α-diacetoxy - 5α:6α-oxido-20-oxo-pregnane is used as starting material.

18. Process as claimed in claim 1, wherein an epoxide of the androstane series is used as starting material.

19. Process as claimed in claim 18, wherein 9β:11β-oxido-17α-methyl-testosterone is used as starting material.

20. Process as claimed in claim 18, wherein 3β:17β-diacetoxy-5α:6α-oxido-androstane is used as starting material.

21. Process as claimed in claim 18, wherein 3β:17β-diacetoxy-6β,7-oxido-5α-androstane is used as starting material.

22. Process as claimed in claim 1, wherein an epoxide of the cholestane series is used as starting material.

23. Process as claimed in claim 22, wherein 3β-hydroxy-5α:6α-oxido-cholestane is used as starting material.

No references cited.

LEWIS GOTTS, *Primary Examiner.*